(12) United States Patent
Yokoyama et al.

(10) Patent No.: US 9,328,738 B2
(45) Date of Patent: May 3, 2016

(54) TURBINE SCROLL PART STRUCTURE (75) Inventors: Takao Yokoyama, Tokyo (JP);
Katsuyuki Osako, Tokyo (JP); Takashi Shiraishi, Tokyo (JP); Koji Wakashima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 561 days.

(21) Appl. No.: 13/879,426

(22) PCT Filed: Dec. 16, 2011

(86) PCT No.: PCT/JP2011/079154
§ 371 (c)(1),
(2), (4) Date: May 22, 2013

(87) PCT Pub. No.: WO2012/090724
PCT Pub. Date: Jul. 5, 2012

(65) Prior Publication Data
US 2013/0266433 A1 Oct. 10, 2013

(30) Foreign Application Priority Data
Dec. 27, 2010 (JP) .................................. 2010-291359

(51) Int. Cl.
F04D 29/42 (2006.01)
F01D 9/02 (2006.01)
F02C 6/12 (2006.01)

(52) U.S. Cl.
CPC ................ F04D 29/42 (2013.01); F01D 9/026 (2013.01); F02C 6/12 (2013.01); F05D 2220/40 (2013.01)

(58) Field of Classification Search
CPC ..... F04D 29/422; F04D 29/403; F04D 29/42; F04D 29/4206; F01D 9/026; F01D 25/14; F01D 29/145; F01D 29/24
See application file for complete search history.

(56) References Cited

FOREIGN PATENT DOCUMENTS

| CN | 1382897 A | 12/2002 | |
|---|---|---|---|
| CN | 1542260 A | 11/2004 | |
| DE | WO 2009065394 A1 * | 5/2009 | ............ F04D 17/165 |
| EP | 1304445 A2 | 4/2003 | |
| JP | 5-44488 A | 2/1993 | |
| JP | 10-68303 A | 3/1998 | |
| JP | 10-231706 A | 9/1998 | |
| JP | 2003-120303 A | 4/2003 | |
| JP | 2006-161574 A | 6/2006 | |
| JP | 4485334 B2 | 4/2010 | |

OTHER PUBLICATIONS

Chinese Notice of Allowance, dated Sep. 1, 2015, for Chinese Application No. 201180052624.2, along with an English translation.
Japanese Decision to grant a patent, dated Nov. 12, 2013, for Japanese Application No. 2010-291359.
International Preliminary Report on Patentability and Written Opinion of the International Searching Authority (Forms PCT/IB/338, PCT/IB/373, PCT/ISA/237, and PCT/IB/326) for International Apln. No. PCT/JP2011/079154, dated Jul. 11, 2013.
Chinese Office Action effective Dec. 3, 2014 issued in corresponding Chinese Application No. 201180052624.2 with English translation.

* cited by examiner

*Primary Examiner* — Richard Edgar
(74) *Attorney, Agent, or Firm* — Birch, Stewart, Kolasch & Birch, LLP (57) ABSTRACT

In a turbine scroll part structure of a radial turbine, a flow passage 3 of a connecting part between an exhaust gas inlet into a turbine housing 5 and a scroll part 1 is offset along an axis line L1 of a rotating shaft of a turbine rotor in an amount H, and a cut-out portion P is formed in a tongue portion 2, which separates the flow passage 3 from a blade side passage 4 through which the exhaust gas flows toward blades 6, for the exhaust gas to flow from the flow passage 3 into the blade side passage 4.

4 Claims, 6 Drawing Sheets

FIG. 3B
SECTION K

FIG. 3C
SECTION M

FIG. 3D
SECTION N

TURBINE SCROLL PART STRUCTURE

TECHNICAL FIELD

The present invention relates to a scroll part structure that forms an exhaust gas passage of a radial turbine, which is used in a turbocharger (exhaust gas turbocharger) of an internal combustion engine, and configured to rotate a turbine rotor by introducing exhaust gas from the spiral scroll part radially toward blades of the turbine rotor to exert a force on the blades, then discharging the gas in an axial direction.

BACKGROUND ART

Radial turbines, which are configured to rotate a turbine rotor by introducing exhaust gas from a spiral scroll part formed inside a turbine housing radially toward blades of the turbine rotor located inside the scroll part to apply a force on the blades, then discharging the gas in an axial direction, have been commonly employed in turbochargers (exhaust gas turbochargers) of internal combustion engines or the like of cars.

Figure 6:
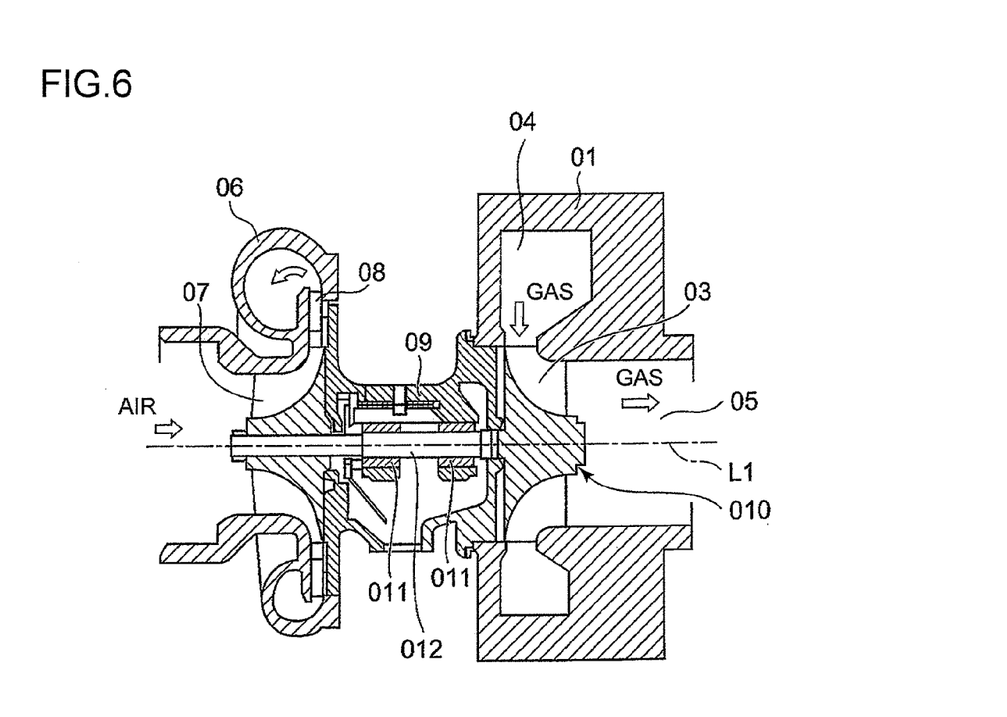
FIG. 6 shows a cross-sectional view along a rotation axis line of a turbocharger that uses a radial turbine to which the present invention is applied.

FIG. 6 shows an example of a conventional turbocharger that uses such a radial turbine disclosed in Japanese Patent Application Laid-open No. 2003-120303 (Patent Document 1). Referring to the drawing, reference numeral 01 denotes a turbine housing, 04 denotes a spiral scroll part formed inside the turbine housing 01, 05 denotes an exhaust gas discharge passage formed by the inner circumference of the turbine housing 01, 06 denotes a compressor housing, and 09 denotes a bearing housing that connects the turbine housing 01 and the compressor housing 06.

Reference numeral 010 denotes a turbine wheel that has a plurality of circumferentially equally spaced turbine blades 03 fixed around the rim. Reference numeral 07 denotes a compressor impeller, 08 denotes a diffuser provided at the air outlet of the compressor impeller 07, and 012 denotes a rotor shaft that connects the turbine wheel 010 and the compressor impeller 07. Reference numeral 011 denotes a pair of bearings attached to the bearing housing 09 to support the rotor shaft 012. Reference symbol L1 denotes the rotation axis of the turbine wheel 010, the compressor impeller, and the rotor shaft 012.

In the turbocharger with such a radial turbine, exhaust gas from an internal combustion engine (not shown) enters the scroll part 04, and while traveling around along the spiral shape of the scroll part 04, it flows to the turbine blades 03 from the outer circumferential inlet ends thereof, then radially flows toward the center of the turbine wheel 010. Having done the expansion work on the turbine wheel 010, the gas then flows in the direction of axis line L1 of the rotor shaft 012 and is discharged from the exhaust gas discharge passage 05 to the outside of the turbocharger.

Figure 7A:
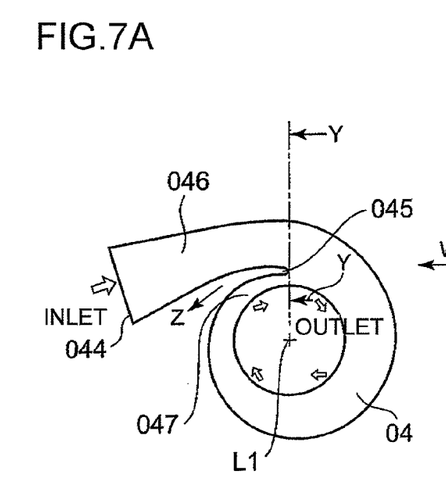
FIG. 7A shows a cross-sectional view, in a direction perpendicular to a turbine rotor axis line, of a tongue portion in a conventional technique.
Figure 7B:
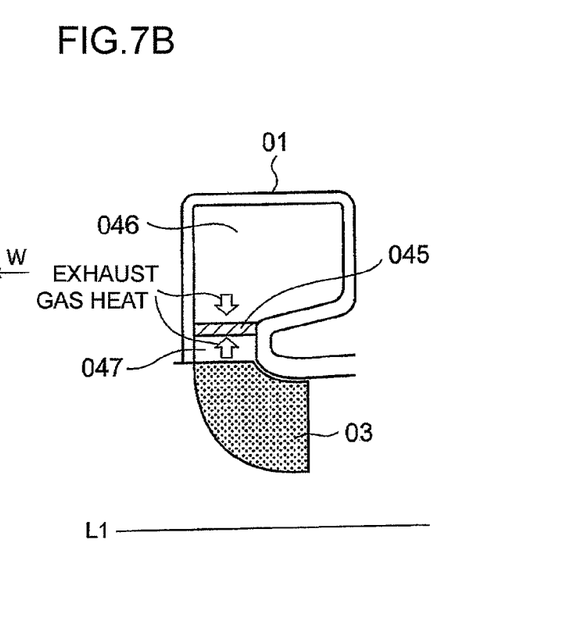
FIG. 7B is a diagram viewed from a direction of arrow W in FIG. 7A.

FIG. 7A shows a schematic configuration diagram of a cross section, in a direction perpendicular to the axis line L1 of the rotor shaft 012, of a tongue portion and its vicinity formed inside at the exhaust gas inlet of the radial turbine of Patent Document 1. FIG. 7B is a diagram viewed from a direction of arrow W in FIG. 7A.

In FIG. 7A, 04 denotes the scroll part, 044 denotes the exhaust gas inlet, and 045 denotes a tongue portion, which is formed at a connecting part between a flow passage 046, which the exhaust gas from the exhaust gas inlet 044 passes through to be introduced into the scroll part 04, and a blade side passage 047, into which the gas flows toward the blades, the tongue portion 045 separating the two passages 046 and 047.

The tongue portion 045 is subjected to the heat of exhaust gas both from the flow passage 046 and the blade side passage 047 as shown in FIG. 7B. Moreover, the tongue portion 045 has poor heat dissipation efficiency to dissipate the accumulated heat because of the narrow heat dissipation path as indicated by the arrow Z.

Accordingly, the temperature of the tongue portion 045 can sometimes reach 800 to 900° C.

Patent Document 1: Japanese Patent Application Laid-open No. 2003-120303

In such a radial turbine, the high-temperature exhaust gas from the engine passes through the flow passage 046, and while traveling around along the spiral shape of the scroll part 04, it flows out into the blade side passage 047.

As the tongue portion 045 is exposed to the high-temperature exhaust gas from both of the flow passage 046 and the blade side passage 047, and because of its heat dissipation path being only in the direction Z (see FIG. 7A), heat tends to accumulate. The tongue portion 045 is therefore prone to surface oxidation due to the high temperature, or to fatigue damage resulting from thermal stress.

A countermeasure for this problem is to use a material having good oxidation resistance and fatigue resistance at high temperatures (such as cast austenitic stainless steel or cast ferritic stainless steel) for the turbine housing 01, which is expensive and causing an increase in cost.

DISCLOSURE OF THE INVENTION

The present invention was made to solve this problem. An object of the invention is to enable a cost reduction through downgrading of heat resistance of the material used for the connecting part (tongue portion) of the turbine housing, by enlarging the surface area of exposure to the external air of the outer part of the connecting part to increase the amount of heat dissipation therefrom and to reduce accumulation of heat in the tongue portion.

To solve the problem described above, the present invention provides a turbine scroll part structure of a radial turbine configured to rotate a turbine rotor by introducing exhaust gas from a spiral scroll part formed inside a turbine housing radially toward blades of the scroll part to exert a force on the blades, then discharging the gas in an axial direction, wherein a flow passage of a connecting part between an exhaust gas inlet into the turbine housing and the scroll part is offset along an axis line of a rotating shaft of the turbine rotor, whereby a wall surface exposed to external air is formed in a vicinity of a tongue portion that separates the flow passage from a blade side passage through which the exhaust gas flows toward the blades, so that heat in the vicinity of the tongue portion is dissipated from the wall surface.

With this configuration, by offsetting the flow passage of the connecting part, the outer part of the connecting part of the turbine housing has a greater surface area that is exposed and heat dissipation therefrom is increased, and accumulation of heat in the tongue portion is reduced, whereby a cost reduction is made possible through downgrading of heat resistance of the material used for the connecting part.

Moreover, forming a cut-out portion can provide an effect of reducing the amount of heat applied to the tongue portion.

In the present invention, preferably, the wall surface may have an axial length changing in accordance with an amount of the offsetting, and the offset amount of the flow passage may be gradually decreased toward a distal end of the tongue portion.

With this configuration, as the tongue portion is offset less at the front, there is a less distinct step at the entrance of the scroll part, which will result in less flow loss of exhaust gas.

In the present invention, preferably, the flow passage may be offset by deforming only an inner circumferential side of the spiral shape.

Thereby, the amount of deformation on the outer circumferential side of the scroll part is reduced to prevent difficulties when installing to the engine, as well as to promote heat dissipation from the tongue portion.

In the present invention, preferably, with reference to a line connecting an axis center of the turbine scroll part and the distal end of the tongue portion, the flow passage may be offset around the axis center in an amount gradually decreasing toward a distal end of the tongue portion where the offset amount is zero, from an angular position at an angle of substantially 45° toward an exhaust gas inlet side.

With this configuration, the offset amount is reduced from the angular position at substantially 45° around the axis center toward the exhaust gas inlet side such that the offset amount is zero at the distal end of the tongue portion, so that the exhaust gas flow is guided in a predetermined direction, which will result in less flow loss of exhaust gas.

By offsetting the passage center line of the connecting part of the turbine housing, the outer part of the connecting part has a greater surface area that is exposed and heat dissipation therefrom is increased, and accumulation of heat in the tongue portion is reduced, whereby a cost reduction is made possible through downgrading of heat resistance of the material used for the connecting part.

BEST MODE FOR CARRYING OUT THE INVENTION

The illustrated embodiments of the present invention will be hereinafter described in detail.

It should be noted that, unless otherwise specified, the size, material, shape, and relative arrangement or the like of constituent components described in these embodiments are only illustrative examples and not intended to limit the scope of this invention.

(First Embodiment)

Figure 1A:
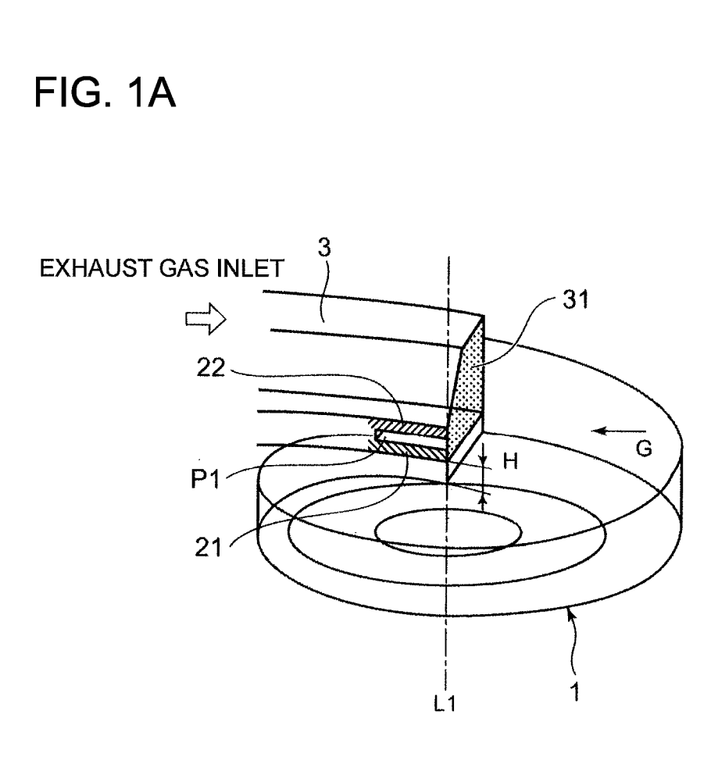
FIG. 1A is a cross-sectional view, in a direction perpendicular to the turbine rotor axis line, of a tongue portion according to a first embodiment of the present invention.
Figure 1B:
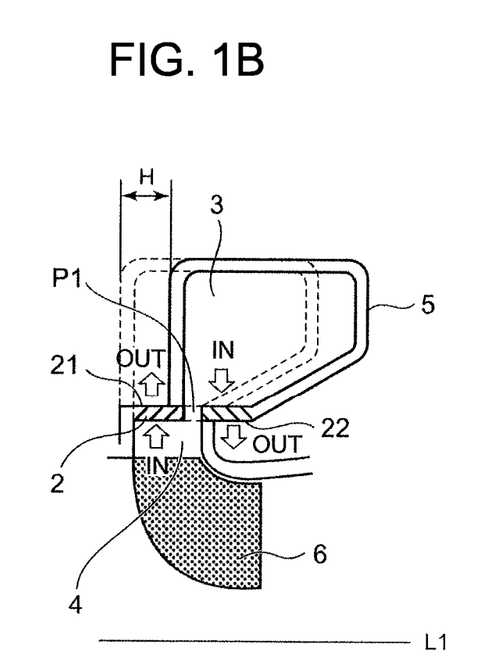
FIG. 1B is a schematic configuration diagram of essential parts showing a cross section of the scroll part and an upper half along the rotation axis line of the turbine rotor.

FIG. 1 shows a schematic configuration diagram of the exhaust gas passage space in a scroll part according to a first embodiment of the present invention.

A turbine scroll part according to the first embodiment of the present invention will be described.

Referring to FIG. 6 which shows the overall structure of a turbocharger that uses a radial turbine to which the present invention is applied, reference numeral 01 denotes a turbine housing, 04 denotes a spiral scroll part formed inside the turbine housing 01, 05 denotes an exhaust gas discharge passage formed by the inner circumference of the turbine housing 01, 06 denotes a compressor housing, and 09 denotes a bearing housing that connects the turbine housing 01 and the compressor housing 06.

Reference numeral 010 denotes a turbine wheel that has a plurality of circumferentially equally spaced turbine blades 03 fixed around the rim. Reference numeral 07 denotes a compressor impeller, 08 a diffuser provided at the air outlet of the compressor impeller 07, and 012 a rotor shaft that connects the turbine wheel 010 and the compressor impeller 07. Reference numeral 011 denotes a pair of bearings attached to the bearing housing 09 to support the rotor shaft 12.

Reference symbol L1 denotes the rotation axis of the turbine wheel 010, the compressor impeller, and the rotor shaft 012.

In the turbocharger having such a radial turbine, exhaust gas from an internal combustion engine (not shown) enters the scroll 04 through an exhaust gas inlet, and while traveling around along the spiral of the scroll part 04, it flows to the plurality of turbine blades 03 from the outer circumferential inlet ends thereof, then radially flows toward the center of the turbine wheel 010. Having done the expansion work on the turbine wheel 010, the gas then flows axially and exits from the exhaust gas discharge passage 05.

The basic structure of the turbocharger with a radial turbine is similar to that of the conventional counterparts as illustrated above.

The present invention offers an improvement in the scroll shape.

FIG. 1A is a cross-sectional view, in a direction perpendicular to the turbine rotor axis line, of a tongue portion according to the first embodiment of the present invention, and FIG. 1B is a schematic configuration diagram of essential parts as viewed from the direction of arrow G in FIG. 1A, illustrating a cross section of the scroll part and an upper half along the rotation axis line of the turbine rotor.

Reference numeral 3 denotes a flow passage formed by the turbine housing 5 for letting the exhaust gas flow into the scroll part 1 from the exhaust gas inlet. Reference numeral 1 denotes the scroll part formed in a spiral shape by the turbine housing 5 for causing the exhaust gas coming in from the flow passage 3 to travel along the spiral shape and for expelling the gas toward the blades 6 through a blade side passage 4.

Reference numeral 2 denotes a connecting part between the flow passage 3 and the scroll part 1; it is called a tongue portion and separates the flow passage from the blade side passage 4.

The flow passage 3 is configured such as to be deformed by an offset amount H along the axis line L1 of the rotating shaft (rotor shaft in FIG. 6) of the turbine rotor.

As seen from the specific structure in FIG. 1B, the cross-sectional area of the exhaust gas flow passage 3 cannot be changed (as such a change in the passage cross-sectional area would change the turbocharger performance).

Therefore, the cross-sectional shape of the flow passage 3 formed by the turbine housing 5 remains the same but is offset along the axis line L1 from the position drawn by dotted lines to the position drawn by solid lines, and the tongue portion 2, too, is accordingly offset.

There are, therefore, formed an outer circumferential wall surface 21 of the blade side passage, and a scroll-side inner circumferential wall surface 22 on the inner side of the scroll part 1, on the outer wall of the turbine housing 5 where the tongue portion 2 exists, to be exposed to the external air, so that heat accumulated in the tongue portion 2 is more readily dissipated from these wall surfaces.

Accordingly, the heat that accumulates in the tongue portion 2 is dissipated from the outer circumferential wall surface 21 of the blade side passage and the scroll-side inner circumferential wall surface 22, and in addition dissipated efficiently from the entire turbine housing 5.

Figure 2:
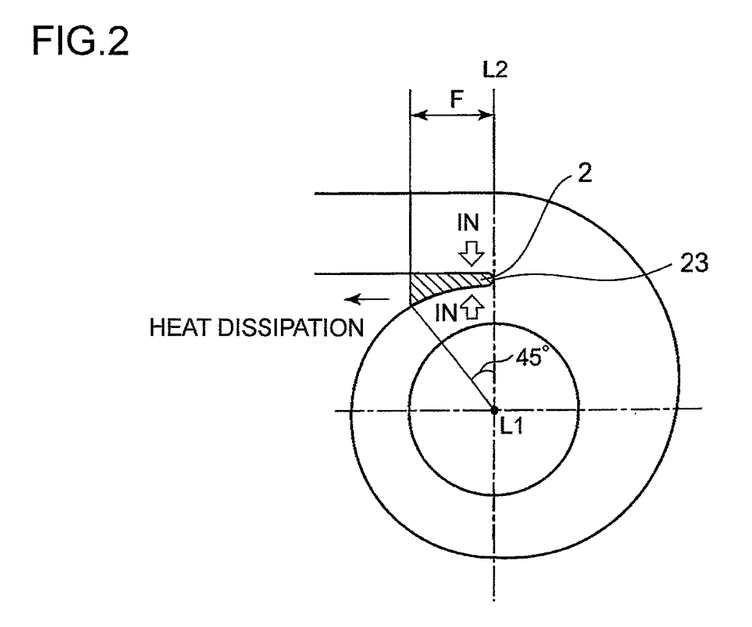
FIG. 2 is a cross-sectional view, in a direction perpendicular to the turbine rotor axis line, of the tongue portion according to the first embodiment of the present invention.

FIG. 2 shows a diagram of a cross section of the tongue portion 2 cut in a direction perpendicular to the axis line L1 of the rotating shaft of the turbine rotor. The tongue portion 2 is formed with a cut-out portion P1 of a length F from the distal end edge 23 thereof, the length F being from a reference line L2 connecting the axis line L1 and the distal end edge 23 of the tongue portion 2 to a position where the tongue portion intersects with the line inclined at substantially 45° around the axis line L1 toward the proximal end (exhaust gas inlet side) of the tongue portion 2. The exhaust gas flows into the blade side passage 4 through this cut-out portion P1.

This is for reducing the area of the tongue portion 2 that is exposed to the exhaust gas to reduce the amount of heat accumulated in the tongue portion 2.

The angle was set 45° to determine the limit position of the length F of the cut-out in the tongue portion 2 because the thickness of the tongue portion 2 around this position is about twice larger than that of the distal end edge 23, so that heat is conducted more to the entire turbine housing 5 for better heat dissipation efficiency of the tongue portion 2.

The width of the cut-out may be set suitably. If the cut-out is too large, too much exhaust gas will flow from the flow passage 3 into the blade side passage 4, which will lower the turbocharger performance. If it is too small, on the other hand, more heat will accumulate in the tongue portion 2, which will accelerate the temperature rise.

Nevertheless, the temperature rise will be slower as compared to the conventional counterparts, owing to the increased area of exposed surfaces 21 and 22.

The offset amount H may therefore be determined to conform to the specifications (performance requirements) of the turbocharger.

As a result, the heat resistance of the material for the turbine housing 5 that is integrally formed with the tongue portion 2 can be downgraded.

While expensive materials such as cast austenitic stainless steel or cast ferritic stainless steel would be used conventionally, the material can be substituted by, for example, cast ferritic iron or the like.

With this configuration, the flow passage 3 of the connecting part is offset along the axis line L1 so that the heat dissipation area of an outer wall portion of the turbine housing 5 where the tongue portion 2 exists is increased, and as more heat is dissipated from the tongue portion, a cost reduction can be achieved through downgrading of the heat resistance of the material used for the turbine housing 5.

Moreover, forming the cut-out portion 23 can provide the effect of reducing the amount of heat applied to the tongue portion 2.

(Second Embodiment)

Elements in this embodiment that are common to the first embodiment will be given the same reference numerals and not be described again.

The structure of the turbine scroll part according to the second embodiment of the present invention will be described with reference to FIG. 3.

Figure 3A:
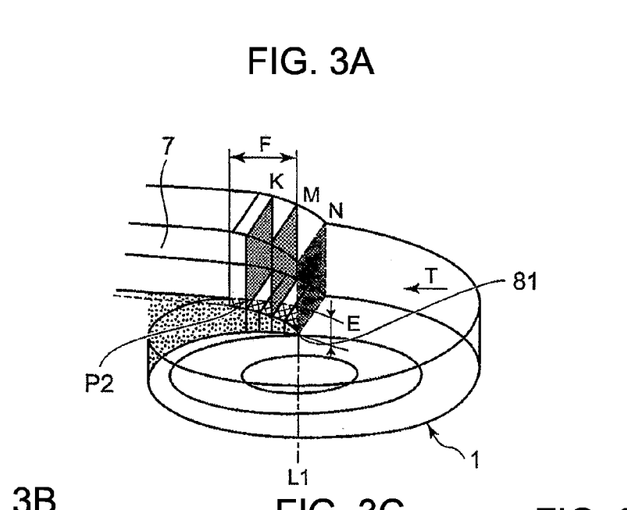
FIG. 3A is a schematic configuration diagram of the exhaust gas passage space of the scroll part according to a second embodiment of the present invention.
Figure 3B:
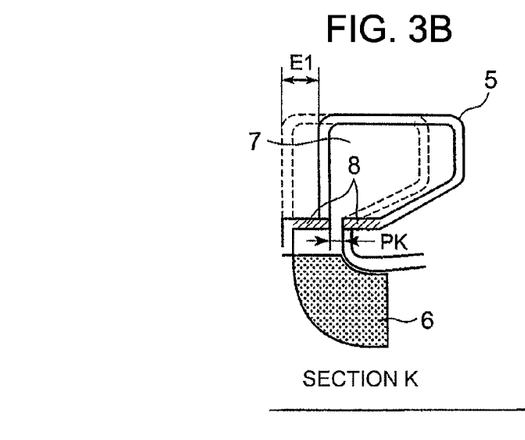
FIG. 3B is a schematic diagram of the cross-sectional shape of part K in FIG. 3A.
Figure 3C:
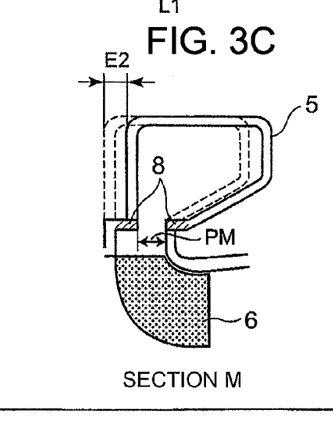
FIG. 3C is a schematic diagram of the cross-sectional shape of part M in FIG. 3A.
Figure 3D:
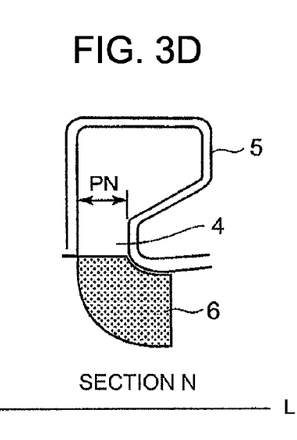
FIG. 3D is a schematic diagram of the cross-sectional shape of part N in FIG. 3A.

FIG. 3A is a schematic configuration diagram of the space of the scroll part in which the exhaust gas flows according to the second embodiment of the present invention. FIG. 3B, FIG. 3C, and FIG. 3D show schematic configuration diagrams of the turbine housing 5 at respective positions K, M, and N of the offset tongue portion 8 as viewed from the direction of arrow T in FIG. 3A.

Reference numeral 7 denotes a flow passage formed by the turbine housing 5 for letting the exhaust gas flow into the scroll part 1 from the exhaust gas inlet. Reference numeral 8 denotes a connecting part between the flow passage 3 and the scroll part 1; it is the tongue portion and separates the flow passage from the blade side passage 4.

As shown in FIG. 3A, the tongue portion 8 is offset along the axis line L1 of the rotating shaft (rotor shaft of FIG. 6) of the turbine rotor relative to the blade side passage 4 by an offset amount E, which is decreased from the proximal end toward the distal end edge 81 of the tongue portion 8 where the offset amount is zero.

As seen from the specific structure in FIG. 3B, FIG. 3C, and FIG. 3D, the cross-sectional area of the exhaust gas flow passage 3 cannot be changed (as such a change in the passage cross-sectional area would change the turbocharger performance).

Therefore, the cross-sectional shape of the flow passage 3 formed by the turbine housing 5 remains the same but is offset along the axis line L1 from the position drawn by dotted lines to the position drawn by solid lines by the offset amount E.

The offset amount E1 in cross section K and the offset amount E2 in cross section M are set such that the condition E1>E2 is met, and the offset amount in cross section N is zero.

Therefore, the width of the cut-out portion P2 formed in the tongue portion 8 increases smoothly from the proximal end position of the cut-out length F toward the distal end edge 81 of the tongue portion 8, and it is the same as the width of the blade side passage 4 at the distal end edge 81.

The width of the cut-out portion P2 shown in FIG. 3B, FIG. 3C, and FIG. 3D becomes progressively larger, i.e., PK < PM <PN.

Figure 4:
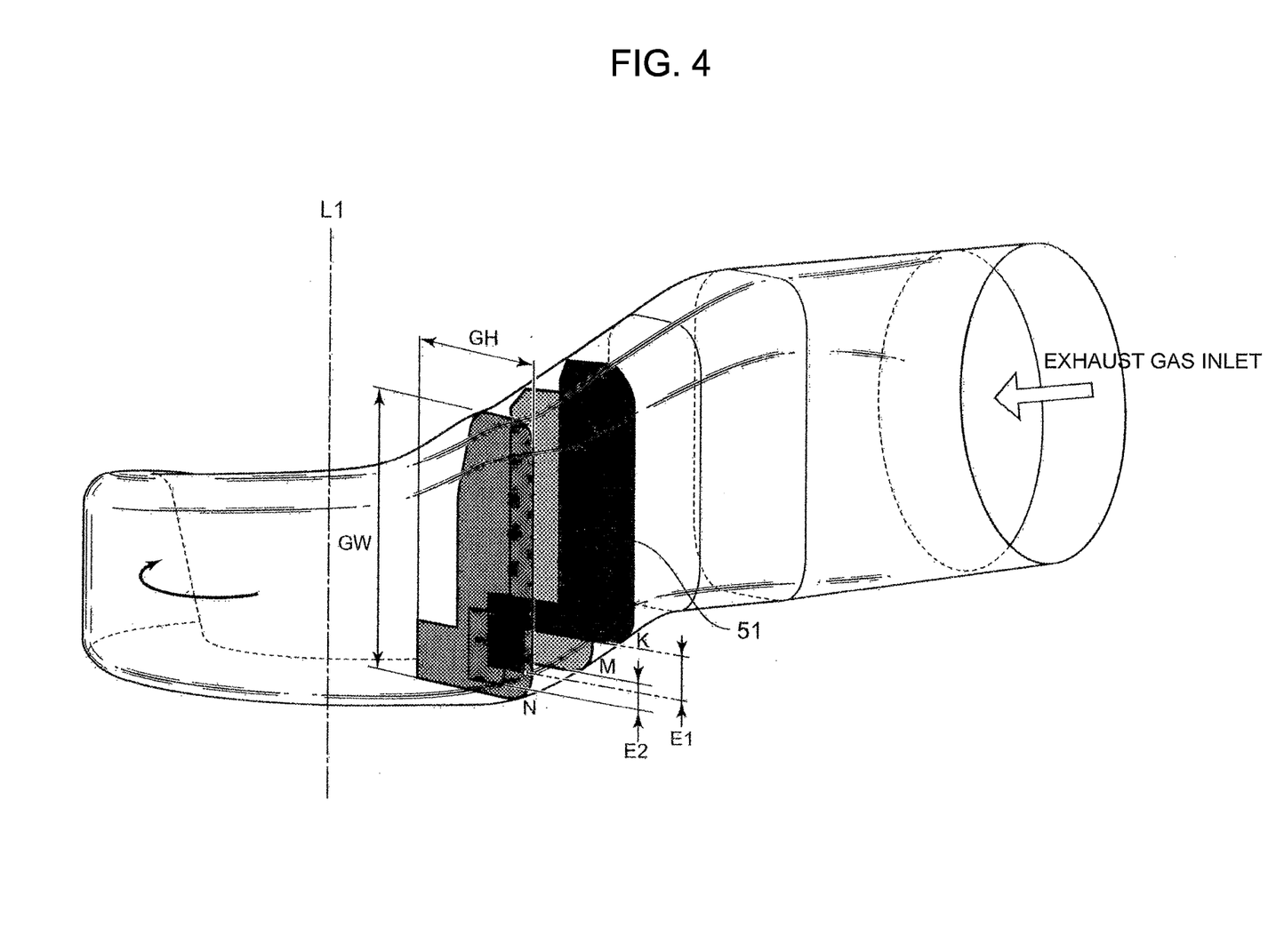
FIG. 4 shows an image of changes of the cross-sectional shape of the exhaust gas passage space of the scroll part according to the second embodiment of the present invention.

FIG. 4 shows an image of changes of the cross-sectional shape of the exhaust gas passage space of the scroll part according to the second embodiment of the present invention.

FIG. 3B, FIG. 3C, and FIG. 3D respectively illustrate the K, M, and N cross sections. Width GW indicates parts parallel to the axis line L1, which correspond to the side 51 on the outer circumference of the scroll part 1. GH indicates the length in the radial direction relative to the axis line L1 from the outer circumference of the scroll part 1 to part of the blade side passage 4.

The offset amount E1 in cross section K is the largest, the offset amount E2 in cross section M is the second largest, and the offset amount in cross section N is zero.

Although three cross sections are shown, as can be easily understood from the drawing, what is disclosed here is that the cross-sectional shape changes continuously.

In this embodiment, the tongue portion 8 has been described as being offset in different amounts at three locations, but the offset amount E (E1, E2) may be set to change smoothly or stepwise.

If set smoothly, there will be no steps at the entrance of the scroll part, so that there will be less flow loss of exhaust gas flowing inside and the turbocharger performance can be maintained.

If set stepwise, on the other hand, the surface of the turbine housing 5 will be undulated, so that there will be more heat dissipation area for the heat conducted from the tongue portion 8, and the temperature rise of the tongue portion 8 will be slowed down.

(Third Embodiment)

Elements in this embodiment that are common to the first embodiment will be given the same reference numerals and not be described again.

The turbine scroll part according to the third embodiment of the present invention will be described with reference to FIG. 5.

Figure 5A:
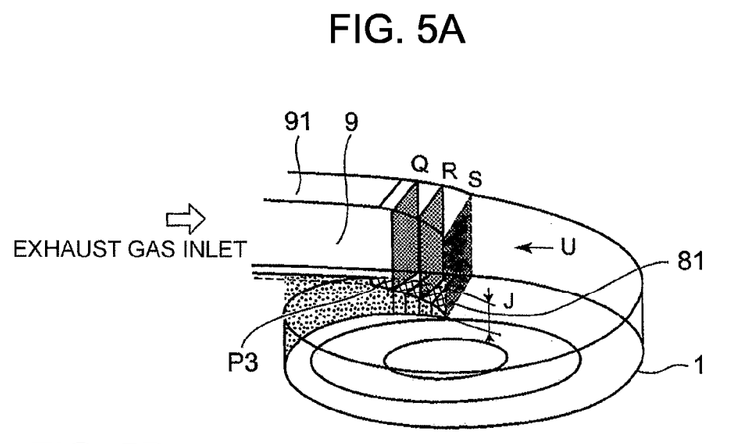
FIG. 5A is a schematic configuration diagram of the exhaust gas passage space of the scroll part according to a third embodiment of the present invention.
Figure 5B:
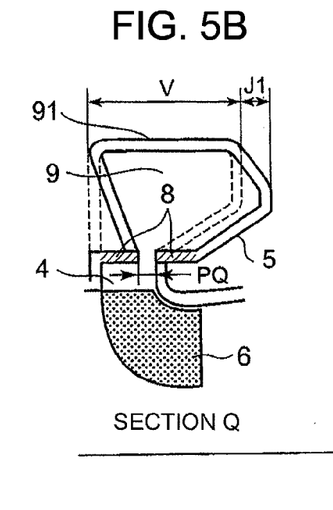
FIG. 5B is a schematic diagram of the cross-sectional shape of part Q in FIG. 5A.
Figure 5C:
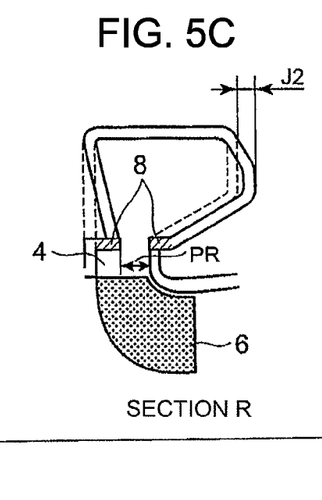
FIG. 5C is a schematic diagram of the cross-sectional shape of part R in FIG. 5A.
Figure 5D:
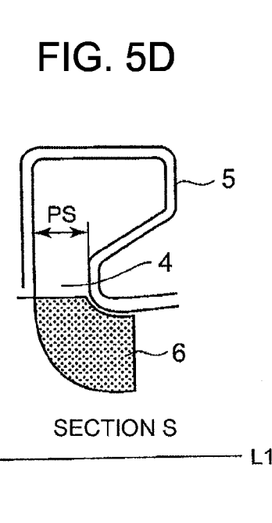
FIG. 5D is a schematic diagram of the cross-sectional shape of part S in FIG. 5A.

FIG. 5A is a schematic configuration diagram of the space of the scroll part in which the exhaust gas flows. FIG. 5B, FIG. 5C and FIG. 5D show schematic configuration diagrams of the turbine housing 5 at respective positions Q, R, and S of the offset tongue portion 8 as viewed from the direction of arrow U in FIG. 5A.

Reference numeral 9 denotes a flow passage formed by the turbine housing 5 for letting the exhaust gas flow into the scroll part 1 from the exhaust gas inlet. Reference numeral 8 denotes a connecting part between the flow passage 3 and the scroll part 1; it is the tongue portion and separates the flow passage from the blade side passage 4.

As shown in FIG. 5A, the tongue portion 8 is offset along the axis line L1 of the rotating shaft (rotor shaft of FIG. 6) of the turbine rotor relative to the blade side passage 4 by an offset amount J, which is decreased from the proximal end toward the distal end edge 81 of the tongue portion 8 where the offset amount is zero.

As seen from the specific structure in FIG. 5B, FIG. 5C, and FIG. 5D, the position and width V of the outer circumferential part 91 of the flow passage 9 are not changed in this embodiment, and only part of the tongue portion 8 and the inner circumferential wall of the scroll part 1 are offset.

Since the cross-sectional area of the exhaust gas flow passage 7 cannot be changed (as such a change in the passage cross-sectional area would change the turbocharger performance), the cross-sectional shape of the offset tongue portion changes from the normal shape shown by dotted lines to the shape shown by solid lines.

Therefore, the cross-sectional area of the flow passage 7 formed by the turbine housing 5 remains the same but the shape changes along the axis line L1 from the position drawn by dotted lines by the offset amount J (J1, J2).

The offset amount J1 in cross section Q and the offset amount J2 in cross section R are set such that the condition J1 >J2 is met, and the offset amount in cross section S is zero.

The width of the cut-out portion P3 shown in FIG. 5B, FIG. 5C, and FIG. 5D becomes progressively larger, i.e., PQ <PR <PS.

Therefore, the width of the cut-out portion P3 formed in the tongue portion 8 in FIG. 5A increases smoothly from the proximal end position (exhaust gas inlet side) of the cut-out length F toward the distal end edge 81 of the tongue portion 8, and it is the same as the width of the blade side passage 4 at the distal end edge 81.

The advantageous effects of this embodiment are that, in addition to the effects of the first and second embodiments, the amount of deformation on the outer circumferential side of the scroll part is reduced to prevent difficulties when installing to the engine, as well as to promote heat dissipation from the tongue portion.

INDUSTRIAL APPLICABILITY

The invention can suitably be applied to radial turbines, which are used in internal combustion engines or the like and configured to rotate the turbine rotor by introducing a fluid radially from a spiral scroll part to exert a force on the blades, then discharging the fluid axially, for improving the output of the internal combustion engine.

The invention claimed is:

1. A turbine scroll part structure of a radial turbine configured to rotate a turbine rotor by introducing exhaust gas from a spiral scroll part formed inside a turbine housing radially toward blades of the scroll part to exert a force on the blades, then discharging the gas in an axial direction, wherein
    a flow passage of a connecting part between an exhaust gas inlet into the turbine housing and the scroll part is offset along an axis line of a rotating shaft of the turbine rotor, whereby a wall surface exposed to external air is formed in a vicinity of a tongue portion that separates the flow passage from a blade side passage through which the exhaust gas flows toward the blades, so that heat in the vicinity of the tongue portion is dissipated from the wall surface.

2. The turbine scroll part structure according to claim 1, wherein the wall surface has an axial length changing in accordance with an amount of the offsetting and the offset amount of the flow passage is gradually decreased toward a distal end of the tongue portion.

3. The turbine scroll part structure according to claim 1, wherein the flow passage is offset by deforming only an inner circumferential side of the spiral shape.

4. The turbine scroll part structure according to claim 1, wherein, with reference to a line connecting an axis center of the turbine scroll part and the distal end of the tongue portion, the flow passage is offset around the axis center in an amount gradually decreasing toward a distal end of the tongue portion where the offset amount is zero, from an angular position at an angle of substantially 45° toward an exhaust gas inlet side.

* * * * *